(12) United States Patent
Galchev

(10) Patent No.: US 7,281,012 B2
(45) Date of Patent: Oct. 9, 2007

(54) SYSTEM AND METHOD FOR IMPLEMENTING MULTIPLE APPLICATION SERVER CLUSTERS USING A COMMON BINARY DIRECTORY STRUCTURE

(75) Inventor: Galin Galchev, Sofia (BG)

(73) Assignee: SAP Aktiengesellschaft, Walldorf (DE)

(*) Notice: Subject to any disclaimer, the term of this patent is extended or adjusted under 35 U.S.C. 154(b) by 455 days.

(21) Appl. No.: 11/024,923

(22) Filed: Dec. 28, 2004

(65) Prior Publication Data

US 2006/0167887 A1 Jul. 27, 2006

(51) Int. Cl.
*G06F 17/00* (2006.01)
(52) U.S. Cl. .................................. 707/100; 707/104.1
(58) Field of Classification Search ................ 707/100, 707/104.1; 717/166, 170; 709/217
See application file for complete search history.

(56) References Cited

U.S. PATENT DOCUMENTS

| | | | |
|---|---|---|---|
| 7,127,472 B1* | 10/2006 | Enokida et al. | 707/103 Y |
| 2003/0093420 A1* | 5/2003 | Ramme | 707/3 |
| 2004/0128370 A1* | 7/2004 | Kortright | 709/221 |
| 2005/0055686 A1* | 3/2005 | Buban et al. | 717/170 |
| 2005/0268294 A1* | 12/2005 | Petev et al. | 717/166 |

OTHER PUBLICATIONS

Tobias Oetiker, "SEPP Software Installation and Sharing System", Proceedings of the Twelfth Systems Administration Conference (LISA '98) Boston, Massachusetts, Dec. 6-11, 1998, pp. 253-260.*

* cited by examiner

*Primary Examiner*—Uyen Le
(74) *Attorney, Agent, or Firm*—Blakely, Sokoloff, Taylor & Zafman, LLP (57) ABSTRACT

A system and method are described for managing a plurality of application servers. In one embodiment, the application servers are organized into groups referred to as "instances." Each instance includes a group of redundant application servers and a dispatcher for distributing service requests to each of the application servers. In addition, a central message passing architecture is defined which allows the various instances to communicate with one another. In one embodiment, a hierarchical configuration data object is stored within a database and is centrally accessible by all of the servers from all of the instances. The hierarchical configuration data object organizes stores binary data (e.g., *.jar files) within a common binary directory and series of sub-directories, thereby simplifying application server management in an enterprise network.

20 Claims, 8 Drawing Sheets

SYSTEM AND METHOD FOR IMPLEMENTING MULTIPLE APPLICATION SERVER CLUSTERS USING A COMMON BINARY DIRECTORY STRUCTURE

BACKGROUND

1. Field of the Invention

This invention relates generally to the field of data processing systems. More particularly, the invention relates to a system and method for implementing multiple application server clusters using a common binary directory structure.

2. Description of the Related Art

Multi-Tiered Enterprise Software

Figure 1A:
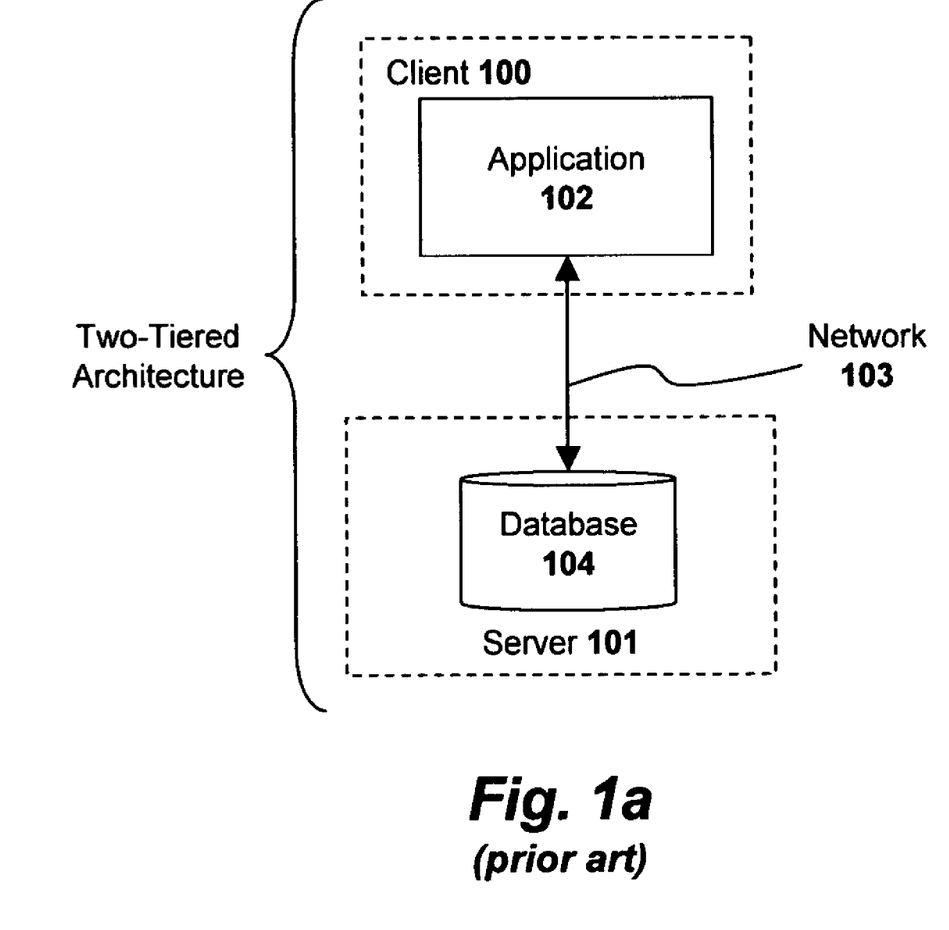
FIG. 1*a* illustrates a traditional two-tier client-server architecture.

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

Figure 1B:
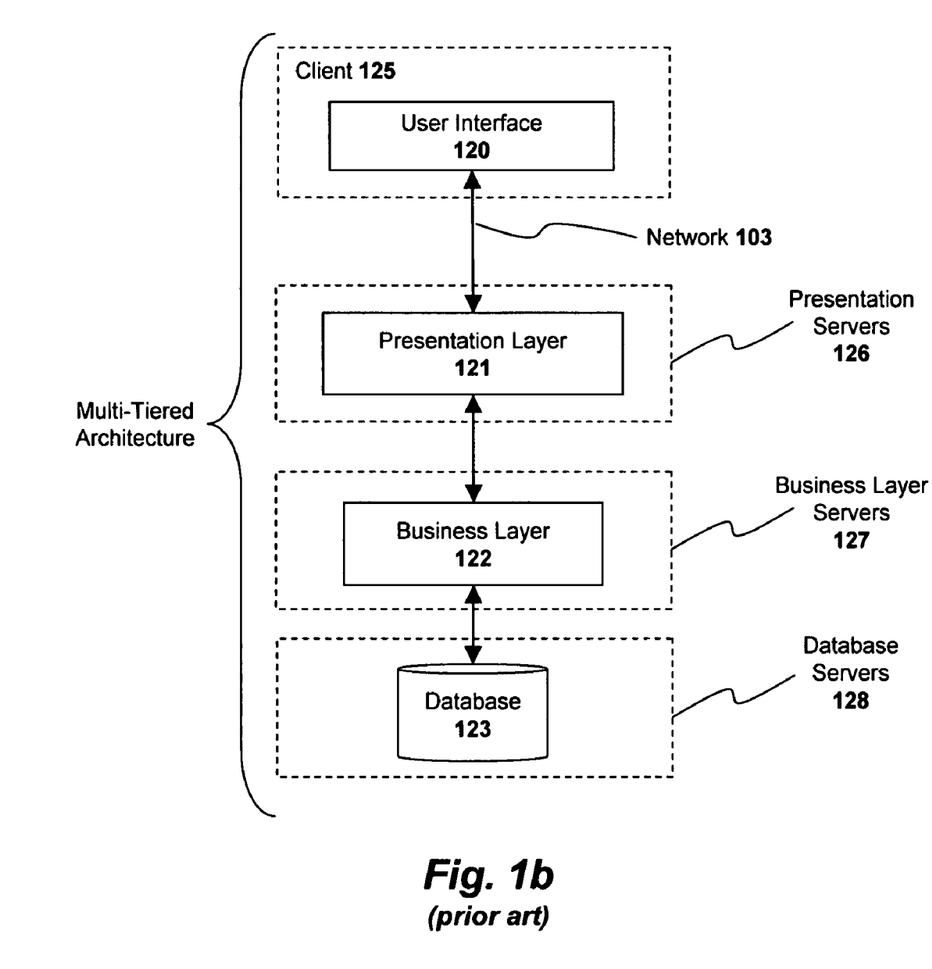
FIG. 1*b* illustrates a prior art multi-tier client-server architecture.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

An Exemplary Application Server Platform

Figure 2:
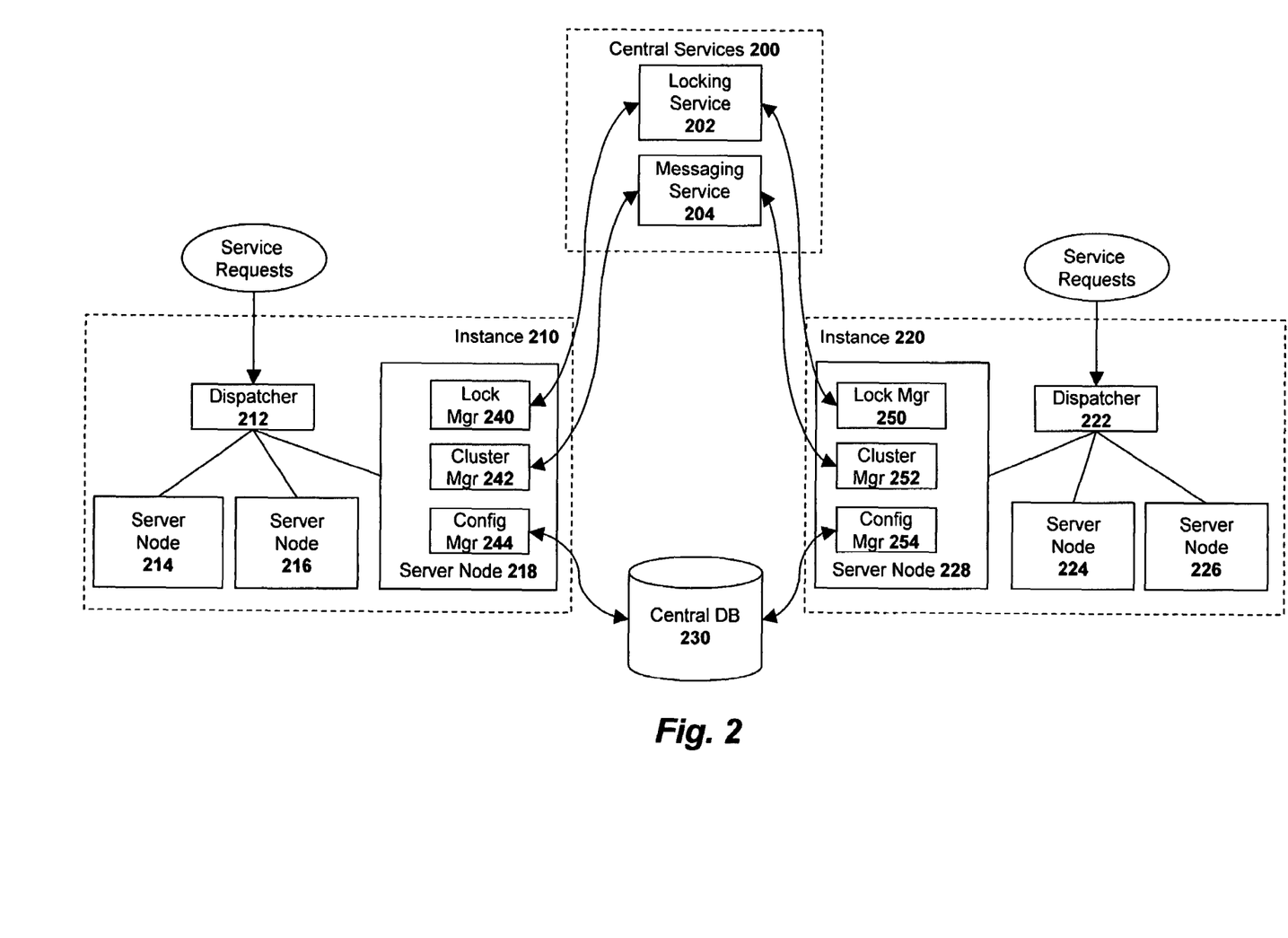
FIG. 2 illustrates a clustered architecture for an application server system.

The assignee of the present application has developed a clustered server platform for implementing a J2EE architecture. As illustrated in FIG. 2, the architecture includes a central services instance 200 and a plurality of application server instances 210, 220. As used herein, the application server instances, 210 and 220, each include a group of application servers 214, 216, 218 and 224, 226, 228, respectively, and a dispatcher, 212, 222, respectively. The central services instance 200 includes a locking service 202 and a messaging service 204 (described below). The combination of all of the application instances 210, 220 and the central services instance 200 is referred to herein as a "cluster." Although the following description will focus solely on instance 210 for the purpose of explanation, the same principles apply to other instances such as instance 220.

The application servers 214, 216, 218 within instance 210 provide the business and/or presentation logic for the network applications supported by the system. Each of the application servers 214, 216, 218 within a particular instance 210 may be configured with a redundant set of application logic and associated data. In one embodiment, the dispatcher 210 distributes service requests from clients to one or more of the application servers 214, 216, 218 based on the load on each of the servers.

The application servers 214, 216, 218 may be Java 2 Enterprise Edition ("J2EE") application servers which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 210, 220 is enabled via the central services instance 200. As illustrated in FIG. 2, the central services instance 200 includes a messaging service 204 and a locking service 202. The message service 204 allows each of the servers within each of the instances to communicate with one another via a message passing protocol. For example, messages from one server may be broadcast to all other servers within the cluster via the messaging service 204 (e.g., such as the cache configuration messages described below). Alternatively, messages may be addressed directly to specific servers within the cluster (i.e., rather than being broadcast to all servers).

The locking service 202 disables access to (i.e., locks) certain specified portions of configuration data and/or program code stored within a central database 230. The locking manager locks data on behalf of various system components which need to synchronize access to specific types of data and program code (e.g., such as the configuration managers 244, 254 illustrated in FIG. 2). As described in detail below, the locking service enables a distributed caching architecture for caching copies of server/dispatcher configuration data.

As illustrated in FIG. 2, each application server (e.g., 218, 228) includes a lock manager 240, 250 for communicating with the locking service 202; a cluster manager 242, 252 for communicating with the messaging service 204; and a configuration manager 244, 254 for communicating with a central database 230 (e.g., to store/retrieve configuration data as described herein).

Figure 3:
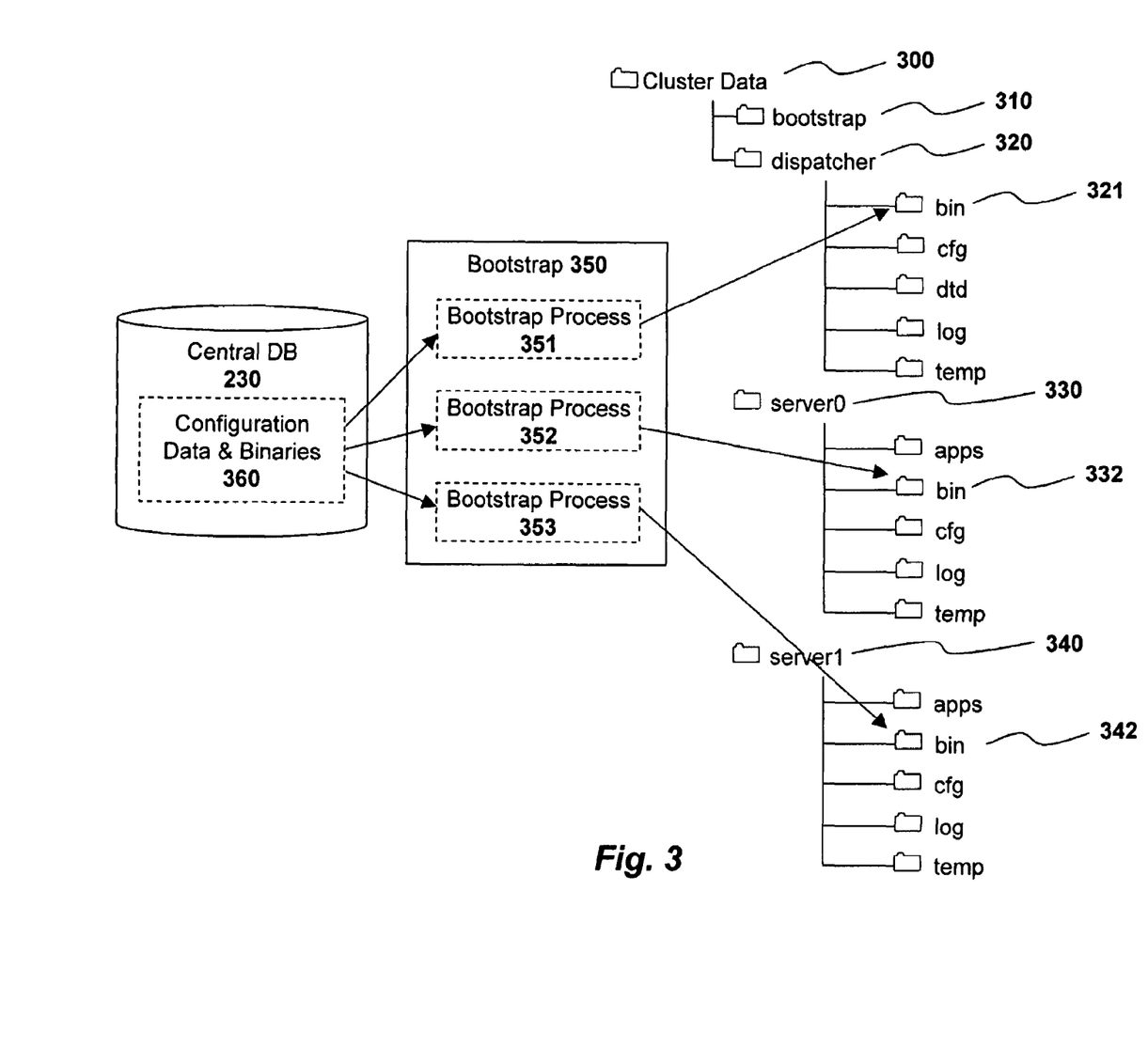
FIG. 3 illustrates a plurality of bootstrap processes loading binaries to/from different /bin directories.

Referring now to FIG. 3, the configuration data and binaries 320 defining the configuration of each of the instances 210 and 220, is stored within the central database 230. The configuration data and binaries define the kernel, services, libraries, and interfaces employed on each dispatcher and server (and various other types of information related to the cluster).

As illustrated in FIG. 3, in one embodiment, a hierarchical directory structure is used to organize and manage the different types of configuration data and binaries employed within the cluster. At the root of the hierarchy is the "cluster data" object 300. In one embodiment, the cluster data object 300 includes bootstrap object 310 for storing bootstrap binaries and configuration parameters; a dispatcher object 320 for storing configuration data and binaries for each dispatcher within the cluster; and a plurality of individual server objects 330, 340 for storing configuration data and binaries for each individual server node. A separate binaries ("bin") directory 332 and 342, respectively, is provided under each server object 330 and 340, respectively. In addition, a separate bin directory 321 is also provided under each dispatcher object 320 within the hierarchy.

As indicated in FIG. 3, when the cluster is started up, bootstrap logic 350 reads the binaries and configuration data 360 from the central database 230 and synchronizes the binaries and configuration data with the file system of each individual instance. During this process, separate bootstrap processes 351-353 synchronize separate sets of binary files (e.g., .jar files in a Java environment) to the various bin directories within the file system of each instance. A separate group of classloaders then load the binaries on each server node and dispatcher. The Java class loading mechanism is well known and is described in the paper *Dynamic Class Loading in the Java Virtual Machine*, by Sheng Liang and Gilad Bracha, published in the proceedings of the ACM conference on Object Oriented Programming Systems, Languages and Applications (1998).

The foregoing configuration is inefficient for a variety of reasons. First, storing a separate set of binary data within a separate /bin directory for each server node within the cluster consumes an unreasonable amount of storage space, particularly given the fact that many of the binary files are the same. Moreover, a significant amount of network bandwidth is consumed as each set of binary files are transferred separately from the common database 230. In addition, a significant amount of processing power is consumed as each set of binaries are separately loaded into memory on each individual server using a separate class loader. Accordingly, what is needed is a more efficient mechanism for managing binary files for a cluster of server nodes.

SUMMARY

A system and method are described for managing a plurality of application servers. In one embodiment, the application servers are organized into groups referred to as "instances." Each instance includes a group of redundant application servers and a dispatcher for distributing service requests to each of the application servers. In addition, a central message passing architecture is defined which allows the various instances to communicate with one another. In one embodiment, a hierarchical configuration data object is stored within a database and is centrally accessible by all of the servers from all of the instances. The hierarchical configuration data object organizes stores binary data (e.g., *.jar files) within a common binary directory and series of sub-directories, thereby simplifying application server management in an enterprise network.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing multiple application server clusters using a common binary directory. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

INTRODUCTION

Figure 4:
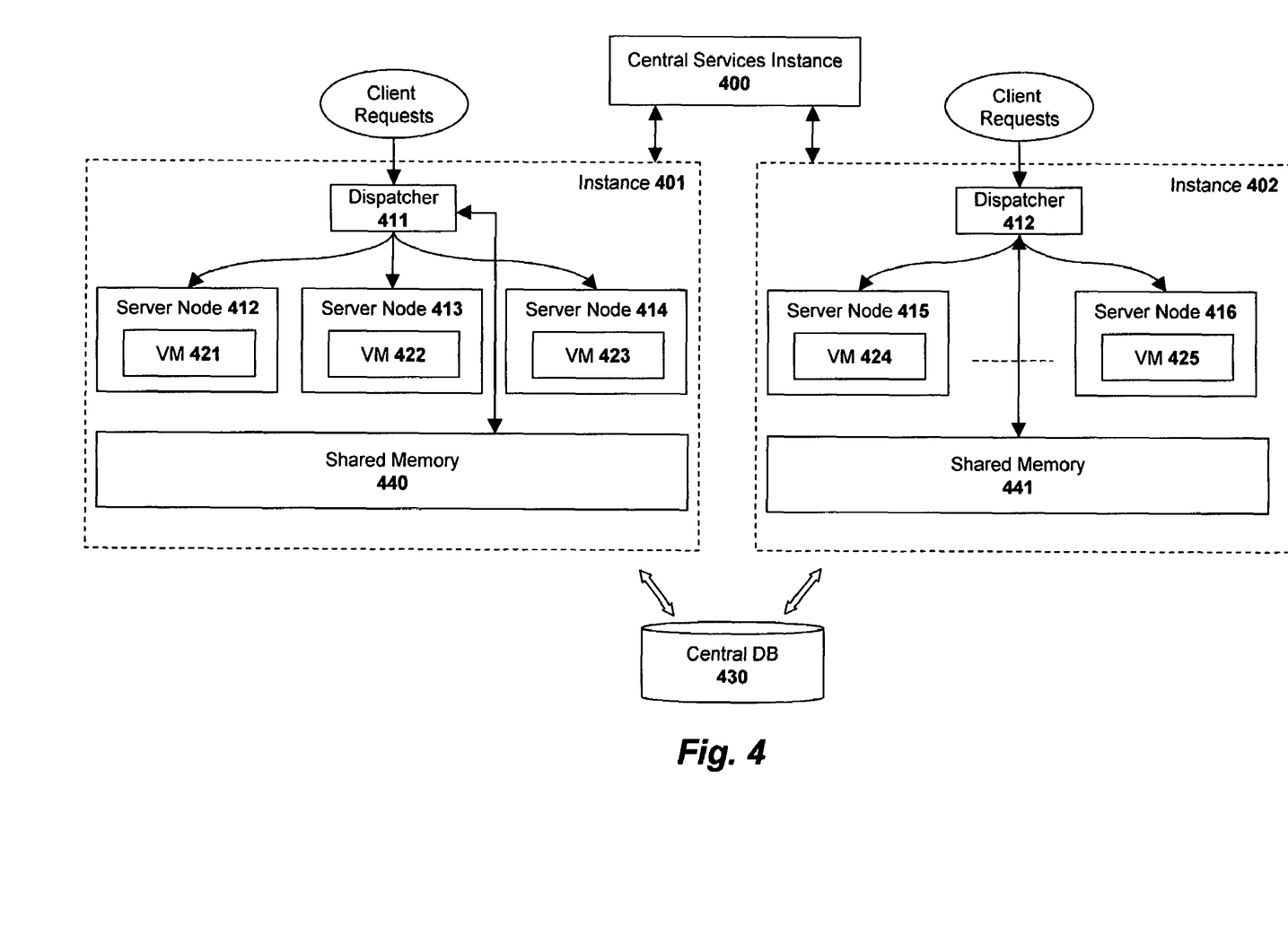
FIG. 4 illustrates a network architecture according to one embodiment of the invention.

A. An Exemplary Cluster Architecture A system architecture according to one embodiment of the invention is illustrated in FIG. 4. The architecture includes a plurality of application server "instances" 401 and 402. The application server instances 401 and 402 each include a group of server nodes 412-414 and 415-416, respectively, and a dispatcher 411 and 412, respectively. The server nodes and dispatchers do not necessarily represent different physical machines.

Rather, in one embodiment, each instance represents a single server machine with one or more processors (e.g., such as an Intel Pentium®class processor) and memory (e.g., DDR SDRAM). Thus, in this embodiment, each "server node" and "dispatcher" is actually a separate process running on the same physical machine (rather than each server process running on it's own physical machine).

The application server instances 401, 402 communicate through a central services instance 400 using message passing techniques. In one embodiment, the central services instance 400 includes a locking service and a messaging service (described below). The combination of all of the application server instances 401 and 402 and the central services instance 400 is referred to herein as a "cluster." Although the following description will focus solely on instance 401 for the purpose of explanation, the same principles apply to other instances within the cluster.

The server nodes 412-414 within instance 401 provide the business and/or presentation logic for the network applications supported by the system. Each of the server nodes 412-414 within a particular instance may be configured with a redundant set of application logic and associated data, represented as virtual machines 421-423 in FIG. 4. In one embodiment, the dispatcher 411 distributes service requests from clients to one or more of the server nodes 412-414 based on the load on each of the servers. For example, in one embodiment, the dispatcher maintains separate queues for each of the 412-414 in a shared memory 440. The dispatcher 411 fills the queues with client requests and the server nodes 412-414 consume the requests from each of their respective queues.

In one embodiment, the server nodes 412-414 may be Java 2 Enterprise Edition ("J2EE") server nodes which support Enterprise Java Bean ("EJB") components and EJB containers (at the business layer) and Servlets and Java Server Pages ("JSP") (at the presentation layer). In this embodiment, the virtual machines 421-425 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

In one embodiment, communication and synchronization between each of the instances 401, 402 is enabled via the central services instance 400. As mentioned above, the central services instance 400 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 430. The locking service locks data on behalf of various system components which need to synchronize access to specific types of data and program code. In one embodiment, the central services instance 400 is the same central services instance as implemented within the Web Application Server version 6.3 and/or 6.4 developed by SAP AG. However, the underlying principles of the invention are not limited to any particular type of central services instance.

In addition, unlike the prior cluster architecture described in the background section above, the architecture shown in FIG. 4 shares objects between virtual machines 421-425. Specifically, in one embodiment, objects which are identified as "shareable" are stored within a shared memory region 440, 441 and are made accessible to multiple virtual machines 421-425. Creating new object instances from scratch in response to client requests can be a costly process, consuming both processing power and network bandwidth. As such, sharing objects between virtual machines as described herein improves the overall response time of the system and reduces server load.

In a shared memory implementation, a shared memory area 440, 441 or "heap" is used to store data objects that can be accessed by multiple virtual machines 421-425. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the system, objects are not put into the shared memory heap by themselves—rather, objects (such as the shared class loaders described herein) are put into the shared memory heap in groups known as "shared closures." A shared closure is an initial object plus the transitive closure of all the objects referenced by the initial object.

B. A Common Binary Directory Structure

Figure 5:
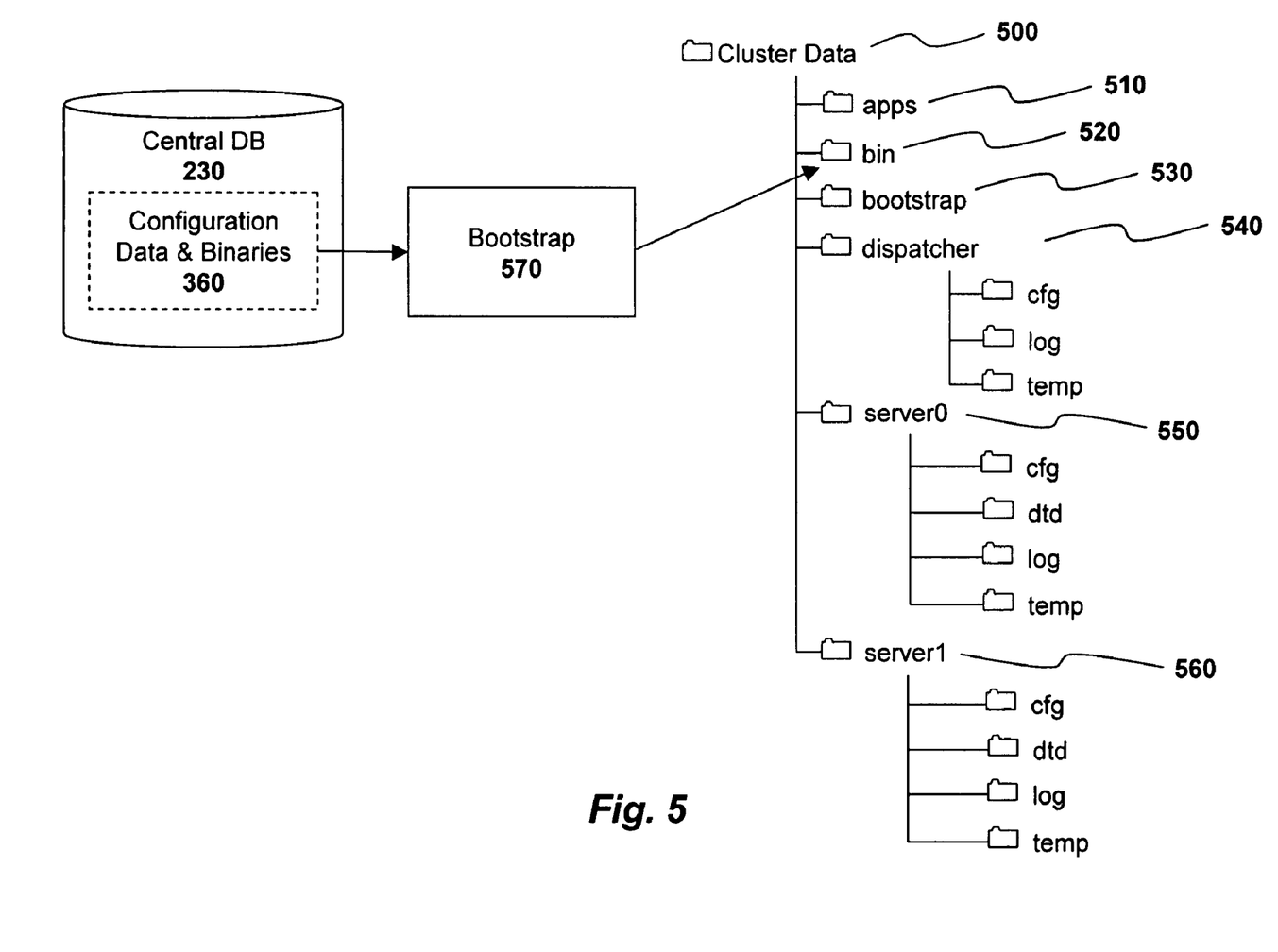
FIG. 5 illustrates a common binary directory employed in one embodiment of the invention.

As illustrated in FIG. 5, as in the prior cluster architecture, a hierarchical directory structure is used to manage the various different types of configuration data and binaries employed within the cluster. At the root of the hierarchy is a cluster data object 500. Unlike prior systems, however, in one embodiment of the invention, a single binary directory ("bin") 520 is used to store binaries for all of the server nodes and dispatchers in the system. Thus, as shown in FIG. 5, a unified bootstrap process is used to synchronize a single set of binary files from the central database 230 to the common binary directory 520, thereby conserving storage space and network bandwidth.

Figure 6:
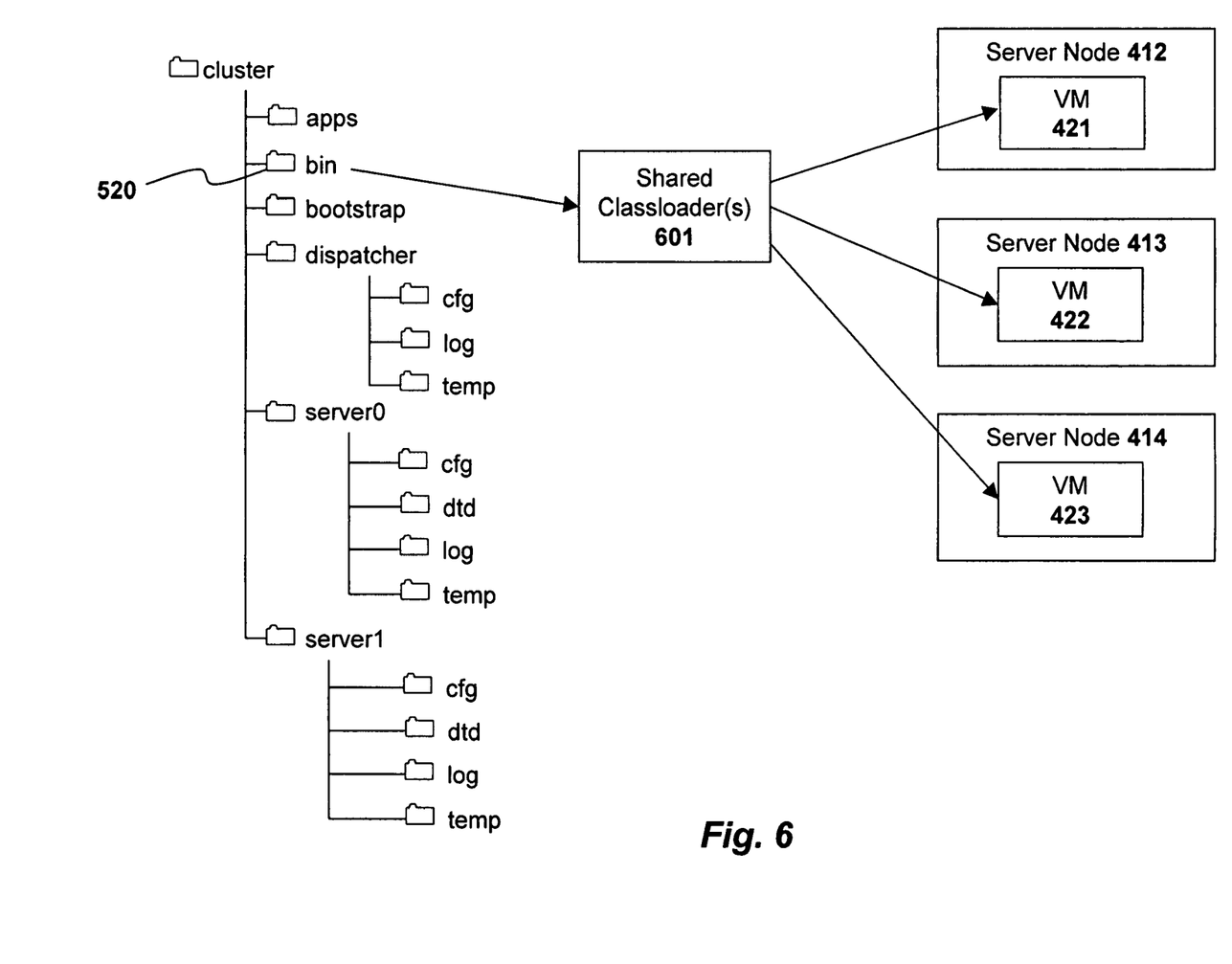
FIG. 6 illustrates a shared class loader loading files from the common binary directory in one embodiment of the invention.

Moreover, in one embodiment, following the bootstrap synchronization process, a shared class loader (or group of shared class loaders) then loads the binaries form the common binary directory 520 into the memory of each server node and/or dispatcher. This is illustrated in FIG. 6 which shows a shared class loader 601 utilizing the same class path (i.e., the common /bin directory) for each virtual machine 421-423. In one embodiment, after binaries are loaded for the first virtual machine 421, the second virtual machine 422 attempts to load the binaries by referencing the shared class loader 601. However, because the binaries have already been loaded, re-loading for the second virtual machine 422 is not necessary.

In other words, the shared classloader 601 shares its loaded classes. So when a shared classloader 601 loads one class requested by one VM 421, and then another VM 422 requests the same class from the classloader, it will be provided with the same class loaded by the request form the first VM. For example, if VM 421 calls ShareClassLoader.loadClass ("MyClass"), ShareClassLoader checks to see if the class is loaded. If not, it loads the class. Subsequently, VM 422 calls ShareClassLoader.loadClass ("MyClass"). ShareClassLoader checks again to determine if the class is loaded. Because it is already loaded, it does not need to load the class again.

In one embodiment, the /bin directory is separated into a plurality of sub-directories for storing different types of binaries. An example is provided in FIG. 7 which shows seven sub-directories positioned under the /bin directory. In one embodiment, each sub-directory is connected with a different shared class loader (i.e., the .jar files in each subfolder represent a classpath for a class loader).

Figure 7:
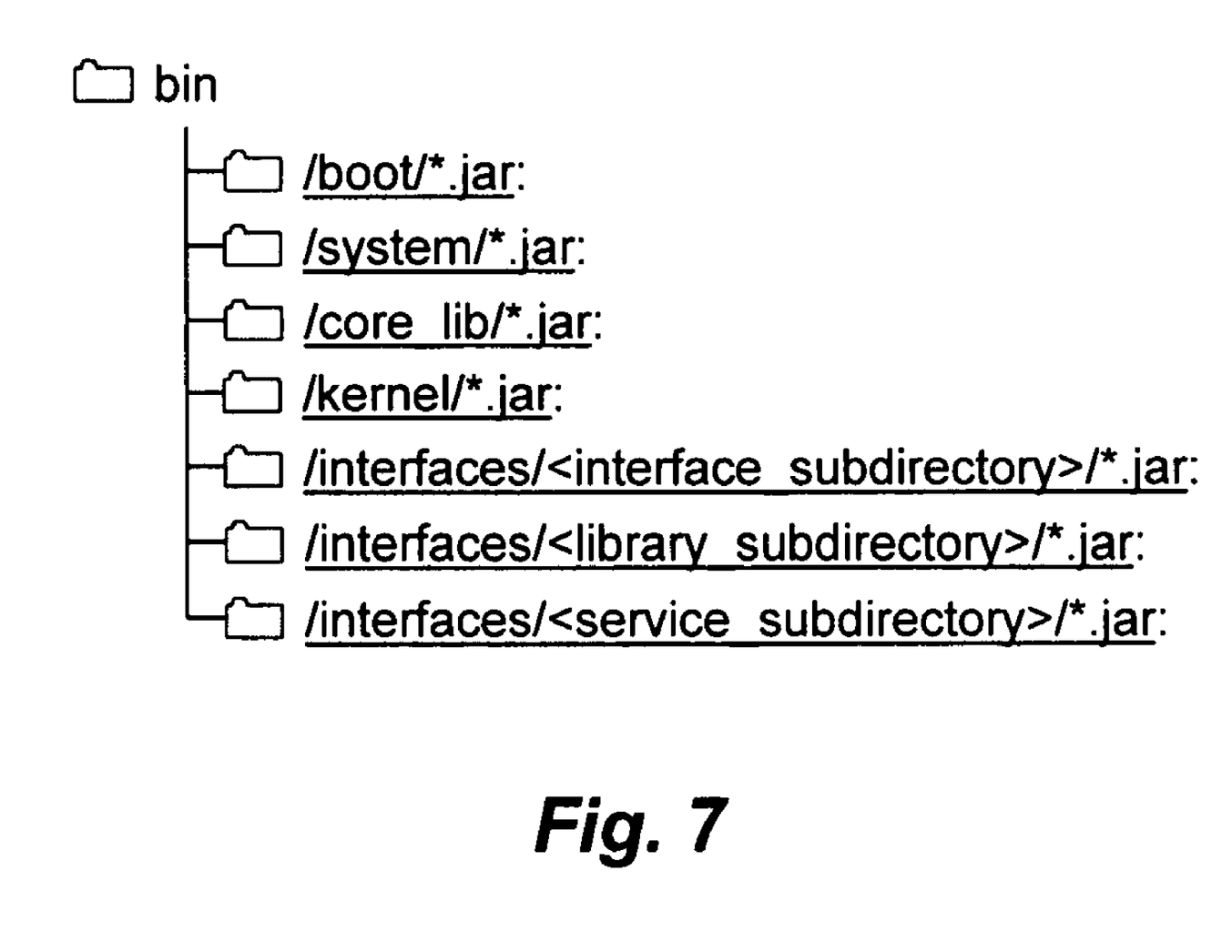
FIG. 7 illustrates a plurality of subdirectories configured beneath the common binary directory in one embodiment of the invention.

As indicated in FIG. 7, the sub-directories contain the following types of binaries:

/boot/*.jar: This sub-directory contains binaries needed for initializing the start of the virtual machine. Binary files for the Frame and Core class loaders (mentioned below) are located here. The binaries from this sub-directory are loaded via the "JVM ClassLoader."

/system/*.jar: Certain binary files for the kernel are stored in the /system sub-directory. These are loaded via the FrameClassLoader. This classloader is a parent of all service, interface, libraries and application classloaders. As such, each service, interface, library or application can use/load these classes.

/core_lib/*.jar: The binary files for a special core library are stored in the /core_lib sub-directory. These are loaded via the "library:core_lib" classloader. The special thing about these libraries is that they are needed by the kernel, but they are not part of the kernel. As such, they are not stored in the /system or /kernel directory. The kernel cannot refer to normal libraries. However, libraries in /core-lib can be used by the kernel. If the kernel or any service, interface, library or application needs these libraries, they can refer them by the name library:core_lib.

/kernel/*.jar: Additional binary files for the kernel are located in the /kernel sub-directory. These are loaded with the CoreClassLoader. In contrast to the FrameClassLoader mentioned above, classes loaded by the CoreClassLoader may not be used/loaded form services, interfaces, libraries and applications.

/interfaces/<interface_subdirectory>/*.jar: Binaries for the different interfaces deployed in the J2EE engine are stored within the /interfaces/ sub-directory. As indicated, the /interfaces sub-directory includes separate sub-directories for each interface.

/ext/<library_subdirectory>/*.jar: Binaries for the different libraries deployed in the J2EE engine are stored within the /ext sub-directory. Separate sub-directories are provided for each library.

/services/<service_subdirectory>/*.jar: Binaries for the various services deployed in the J2EE engine are stored here. Once again, a separate sub-directory may be provided for each individual service.

As mentioned above, shared class loaders are employed in one embodiment of the invention.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above use a specific hierarchy for managing binary files and configuration data, various alternate organizational hierarchies may be defined while still complying with the underlying principles of the invention. Moreover, although a Java implementation is described above, the underlying principles of the invention are not limited to Java. Accordingly, the scope and spirit of the invention should be judged in terms of the claims which follow.

What is claimed is:

1. A system comprising:
   a plurality of application servers communicatively coupled on an enterprise network, the plurality of application servers to serve applications over the enterprise network to a plurality of clients, each of the application servers including a plurality of virtual machines executed thereon; and
   a hierarchical directory to store data associated with each of the application servers, the hierarchical directory including a binary directory for storing binary files common to all of the virtual machines executed on each application server.

2. The system as in claim 1 wherein the binary directory is comprised of a plurality of sub-directories, each sub-directory containing binary files for a different type of virtual machine program code.

3. The system as in claim 2 wherein the binary directory includes a first sub-directory for storing kernel binaries, a second sub-directory for storing interface binaries, a third sub-directory for storing Frame and Core class loaders, and a fourth sub-directory for storing library binaries.

4. The system as in claim 3 further comprising:
   a separate shared class loader associated with each of the sub-directories, the shared class loader to load the binary files from each of their respective sub-directories into memory of each virtual machine within an application server.

5. The system as in claim 1 further comprising:
   a shared class loader to load the binary files into memory of each virtual machine within an application server.

6. The system as in claim 1 further comprising:
   a central database to store copies of the binary files; and
   bootstrap program code to synchronize the copies of the binary files stored within the database with the common binary directory for each application server.

7. The system as in claim 1 wherein the virtual machines are Java virtual machines and wherein the binary files are *.jar files.

8. A system comprising:
application server means communicatively coupled on an enterprise network, the plurality of application server means to serve applications over the enterprise network to a plurality of clients, each of the application server means including a plurality of virtual machines executed thereon; and
hierarchical storage means to store data associated with each of the application servers, the hierarchical storage means including a binary directory means for storing binary files common to all of the virtual machines executed on each application server means.

9. The system as in claim 8 wherein the binary directory means is comprised of sub-directory means, each sub-directory means containing binary files for a different type of virtual machine program code.

10. The system as in claim 9 wherein the binary directory means includes a first sub-directory for storing kernel binaries, a second sub-directory for storing interface binaries, a third sub-directory for storing Frame and Core class loaders, and a fourth sub-directory for storing library binaries.

11. The system as in claim 10 further comprising:
separate shared class loader means associated with each of the sub-directories, the shared class loader means to load the binary files from each of their respective sub-directories into memory of each virtual machine within an application server means.

12. The system as in claim 8 further comprising:
shared class loader means to load the binary files into memory of each virtual machine within an application server.

13. The system as in claim 8 further comprising:
central database means to store copies of the binary files; and
bootstrap means to synchronize the copies of the binary files stored within the database with the common binary directory means for each application server means.

14. The system as in claim 8 wherein the virtual machines are Java virtual machines and wherein the binary files are *.jar files.

15. A method comprising:
generating a binary directory within a hierarchical directory structure, the binary directory for storing binary files common to all of the virtual machines executed on each application server within a plurality of application servers communicatively coupled on an enterprise network;
synchronizing the binary files within the binary directory with binary files stored in a database central to each of the application servers; and
loading the binary files from the binary directory into memory of each virtual machine.

16. The method as in claim 15 wherein a shared class loader is used to load the binary files from the binary directory into the memory of each virtual machine.

17. The method as in claim 15 wherein the binary directory is comprised of a plurality of sub-directories, each sub-directory containing binary files for a different type of virtual machine program code.

18. The method as in claim 17 wherein the binary directory includes a first sub-directory for storing kernel binaries, a second sub-directory for storing interface binaries, a third sub-directory for storing Frame and Core class loaders and a fourth sub-directory for storing library binaries.

19. The method as in claim 18 wherein a separate class loader associated with each of the sub-directories is provided, the shared class loader to load the binary files from each of their respective sub-directories into memory of each virtual machine within an application server.

20. The method as in claim 15 wherein the virtual machines are Java virtual machines and wherein the binary files are *.jar files.

* * * * *